Feb. 23, 1932.  W. S. BRUBAKER  1,846,541
FLOAT VALVE
Filed Feb. 13, 1928

INVENTOR.
WALTER S. BRUBAKER
By Eugene C. Gott Jr.
Attorney.

Patented Feb. 23, 1932

1,846,541

UNITED STATES PATENT OFFICE

WALTER S. BRUBAKER, OF OAKLAND, CALIFORNIA, ASSIGNOR TO GRANBERG METER CORPORATION, OF SAN FRANCISCO, CALIFORNIA, A CORPORATION OF CALIFORNIA

FLOAT VALVE

Application filed February 13, 1928. Serial No. 253,838.

This invention relates to valves for cutting off flow and particularly the type referred to as float valves.

It is one object of this invention to produce a new and improved valve that is designed to automatically close just before the supply of liquid entering the inlet becomes exhausted and to reopen automatically when that supply is replenished. This is accomplished by the use of a float attached to the valve, which automatically allows seating of the valve when the level of the liquid recedes to the float, and is particularly advantageous to protect meters or other liquids handling mechanism against entrance of air.

It is a further object of this invention to provide simple yet effective guides for both the float and the valve so that the valve may be properly seated whenever it closes.

A hood or cup of slightly greater diameter than the float is mounted over the latter and acts as a guide for the float in its movements, besides definitely limiting its upward movement. It is a further object to provide this hood of such form that it also has the additional function of shielding the float from the high velocity liquid flow through the valve, thereby preventing valve fluctuation and also preventing the liquid flow from exerting a valve closing force on the float.

A guide is provided in the valve housing in which the valve stem is slidably received, and a still further aim is to provide a novel plunger slidable in the lower portion of this same guide for raising the valve from its seat whenever necessary.

Another object is to provide a novel housing for the valve, requires a minimum of space, may be conveniently and quickly inserted in any pipe line, and readily permits removal of one housing section for valve inspection, without disturbing the connections between the housing and line.

Other objects and advantages of this invention will be apparent from the following description taken in conjunction with the accompanying drawings, in which.

Figure 2:
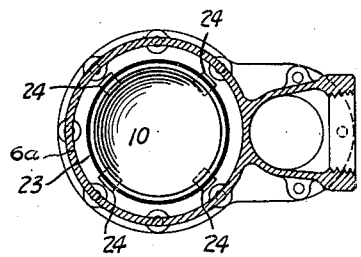
Fig. 2 is the horizontal section of the valve taken on the II—II line of Fig. 1.

In the drawings above briefly described, the numeral 3 denotes generally the improved float valve. The valve housing consists of two sections or castings 4 and 5 respectively, bolted or otherwise detachably secured together. The casting or section 4 provides a liquid inlet 6, a liquid outlet 7, and a float chamber 6ª, while the section or casting 5 provides a bottom 6ᵇ for the chamber 6ª, a valve seat 8 in said bottom, and a passage 5ª from said seat to the outlet 7. The valve preferably consists of two discs, the upper being of metal and the lower of some slightly resilient material, such as fibre or leather, in order to make a liquid-tight closure.

The valve 9 is attached to the float 10 by the valve stem 11 and is held in position by the washer 12 and the nut 13. The lower end of the valve stem 11 at all times moves within the guide bore 14 in the casting 5, which acts as a guide in properly centering and seating the valve 9. The bore 14 extends from the interior to the exterior of the housing and allows the insertion therein of a plunger 15 from within the casing. Around the plunger 15 is the packing 16, held by a nut 18 which provides a sliding liquid-tight connection, and attached to the lower end 17 of the plunger 15 is a knob 19, which is secured thereto by collar 20. In order to maintain the plunger 15 in the position shown in Fig. 1, a coil spring 21 bears against the knob 19 and an offset portion 22 on the housing provided for that purpose. The plunger is provided as a means of raising the valve 9 by hand, for reasons such as those hereinafter explained.

Figure 1:
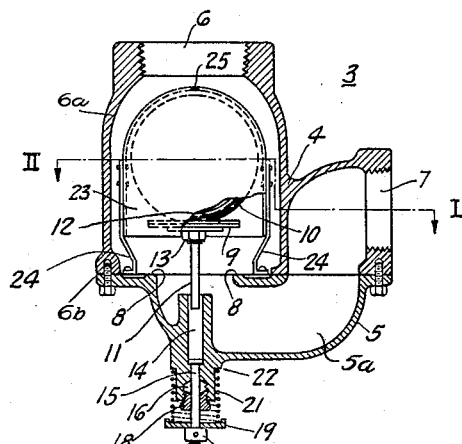
Fig. 1 is the vertical section of the valve with a portion of the cup broken away.

In order to guide the float 10 and limit its upward movement as well as to protect it from the force of the flow entering the inlet 6, a hood or inverted cup 23 of slightly greater diameter and height than the float 10, is provided. The cup 23 is suitably supported by the supports 24 and the casting 5. In the top of the cup there is a hole 25 to allow the escape of any air that may collect at that point. When the float 10 and valve 9 are raised, they are both within the confines of the cup or hood 23 as seen in Fig. 1, and in this position, they are shielded against the high velocity liquid flow through the casing, so that there can be no impingement of liquid against float or valve to exert a valve-closing force.

In operation, when the supply of liquid entering the inlet 6 becomes exhausted, the liquid level in the valve will recede. Obviously, the float will drop with the liquid level seating the valve, and when more liquid is supplied, the float will raise the valve and allow the flow to continue. Should the valve fail to open automatically, it may be raised manually by pushing the knob 19 upwardly against the action of the spring 21. Such an emergency may arise when the liquid is drained from the pipe at a point beyond the outlet 7 and due to the unbalanced pressure on the valve, from the liquid above it, the valve may become so firmly seated that the float is incapable of raising it. Then too, if the valve be used in such manner that the unbalanced pressure caused by valve-closing, operates an automatic stopping means for the motor of a liquid discharge pump, as in my pending U. S. application Ser. No. 249,188, filed January 24, 1928, the knob 19 is instrumental in again restoring pressure to return the motor-stopping means to its normal inactive position, again allowing starting of the motor.

The particular construction of the housing of the valve affords many advantages. For example: Lower casting 5 may be removed to inspect the valve for any purpose without disconnecting the valve from the line, and upon such removal, the cup or hood 23 prevents accidental dropping of the valve and float. In addition, the housing is designed in the manner shown, so that the inlet 6 and the outlet 7, which are part of the heavy casting 4, are attached to the line and all the strains of the pipe line connections and also those due to the original fitting up of the line are borne by this heavy casting, while a comparatively light casting 5 provides the valve seat and connects the inlet with the outlet.

Such a valve naturally has many uses but is designed particularly for systems used on tank trucks for handling petroleum oils such as shown in my above-mentioned application. In such systems it is necessary to eliminate air from the line at points beyond the valve. For example: If a liquid meter were attached to the outlet 7, or at some point beyond in the liquid conducting line leading to the meter the admission of air to the meter would cause large errors in the meter reading, and it is therefore a necessity that air be entirely excluded if accurate measurements of the liquid flowing through the meter are to be made. This end is attained by closing of the valve 9 as soon as the liquid in the valve casing lowers and is replaced by air, allowing float 10 to drop.

Having now more particularly described this invention, what I claim is:

1. A valve comprising in combination a housing provided with a valve seat, a valve adapted to rest on said seat, a float controlling the movement of the valve, a valve stem connecting the float and the valve and extending below the latter, a guide in the housing, an inverted cup positioned over the valve seat and connected thereto, a plunger positioned in said guide below said valve stem, a spring around the plunger, said plunger being adapted to be actuated against the action of the spring from the outside of the housing to raise said valve and float.

2. A valve comprising in combination a valve adapted to stop flow, a float controlling the valve, a valve stem connecting the float with the valve and extending below the latter, a casing for the valve assembly consisting of a two-piece casting, one casting providing an inlet, an outlet, and a housing for the float, the second casting consisting of a connection between the inlet and the outlet, a seat for the valve and a guide to receive the valve stem to properly seat the valve.

3. A float valve comprising in combination a valve adapted to stop flow, a float controlling the position of the valve, a valve stem connecting the float and the valve and having an extension below the latter, a casing for the valve assembly consisting of a two piece casting, one casting providing an inlet, an outlet and a housing for the float, a second casting removable from the first casting without disturbing the connection between the casing and the line in which it is inserted, said second casting consisting of a connection between the inlet and the outlet, a seat for the valve, and a guide to receive the valve stem to properly seat the valve.

4. A float valve comprising a valve member, a float over and connected with said valve member for normally holding it open, and a housing embodying two detachably connected sections, one of said sections providing an inlet, an outlet, and a chamber for the float; the other of said sections providing a bottom for said chamber, a valve seat in said bottom, and a passage from said seat to said outlet; whereby said other section, the valve and float may be removed without disturbing line connections with said inlet and outlet of said one section.

5. A structure as specified in claim 4; together with a hood over said float and secured to said chamber bottom, thereby shielding said float against liquid flow and preventing accidental dropping of the float and valve upon removal of said other section.

6. A device of the class described comprising a float valve, and a housing embodying two detachably connected sections, one of said sections embodying an inlet, an outlet, and a chamber for the float valve; the other of said sections embodying a valve seat for said float valve, and a passage from said seat to said outlet, whereby said other section and float valve may be removed without disturbing line connections with said inlet and outlet of said one section.

7. A structure as specified in claim 6; together with a hood over said float valve and secured to said seat, thereby shielding said float valve against liquid flow and preventing accidental dropping of the float valve upon removal of said other section.

WALTER S. BRUBAKER.